Dec. 1, 1942.     H. H. ARMSTRONG     2,303,973
METHOD OF AND APPARATUS FOR PRODUCTION OF MASTER ALLOYS
Filed Sept. 22, 1939     2 Sheets-Sheet 2
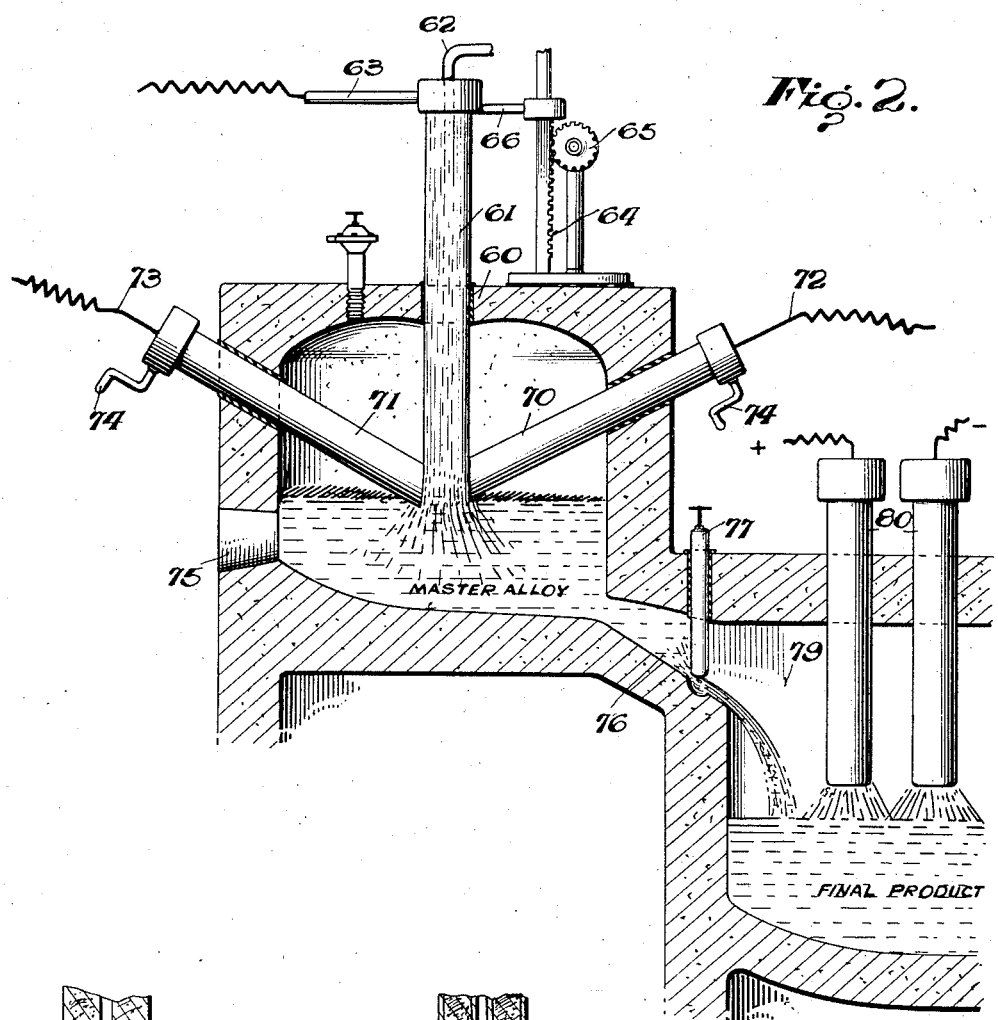
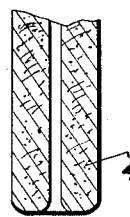
Inventor
H. H. Armstrong.
By Raymond J. Horton
Attorney Patented Dec. 1, 1942

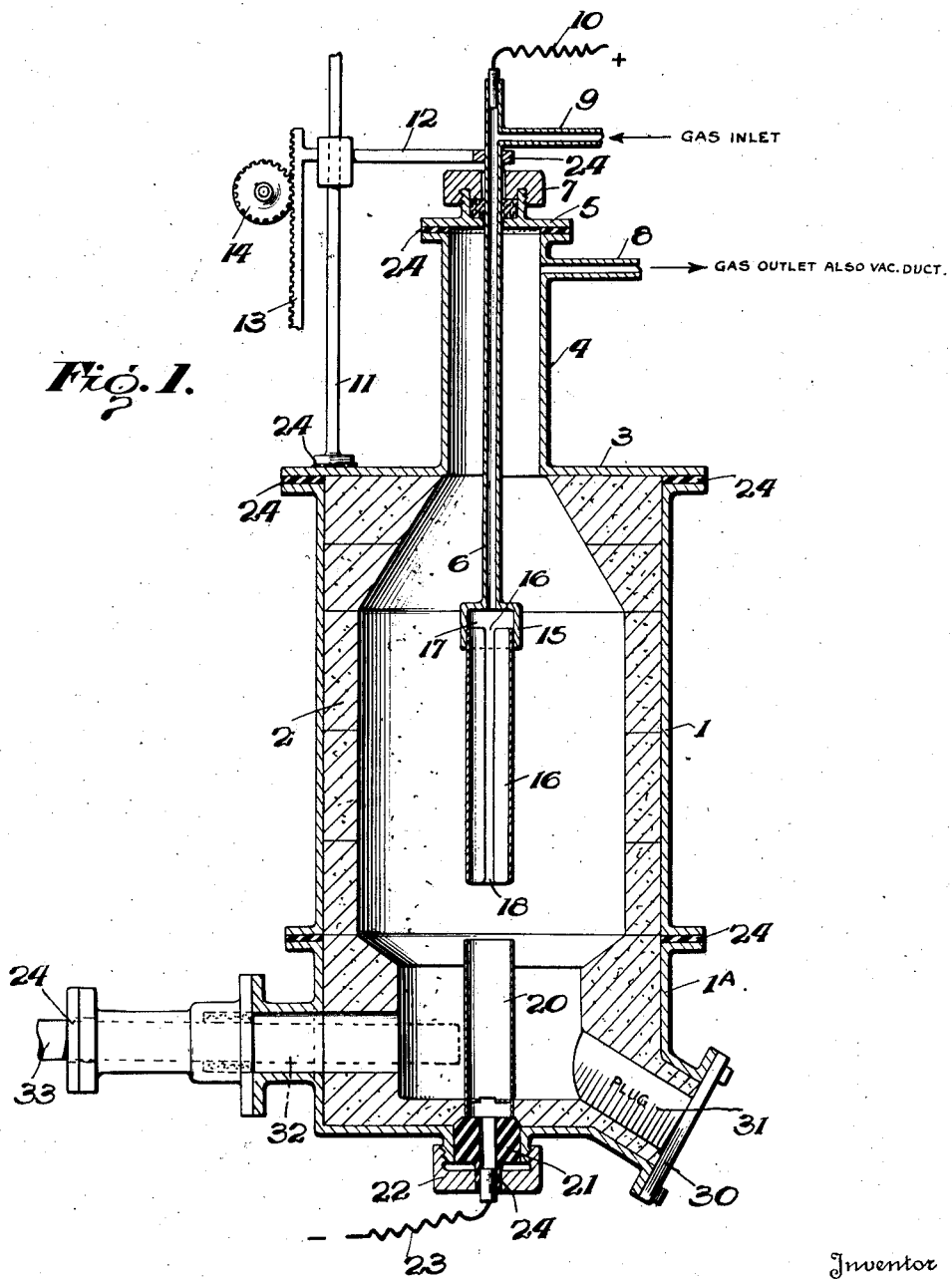

2,303,973

UNITED STATES PATENT OFFICE 2,303,973

METHOD OF AND APPARATUS FOR PRODUCTION OF MASTER ALLOYS

Harry Howard Armstrong, Newport, Pa.

Application September 22, 1939, Serial No. 296,620

10 Claims. (Cl. 75—10)

This invention relates to the thermal reduction of metal compounds, more particularly to an improved method of and apparatus for the production of alloys.

There have been many methods proposed for the production of metals and alloys. As is known, among such methods are those involving electrolysis of fused baths and electric furnace methods. The application of the electric furnace to steel metallurgy has achieved a considerable success. The electric furnace has had an important place in the development of the more refractory or high melting ferrous alloys such as the production of stainless steel, nickel-chromium, vanadium and tungsten steels, high speed steels and the like.

The present invention in one phase relates to an improved electric furnace for producing improved alloys.

The invention is particularly, although not exclusively, concerned with the production of beryllium and lithium bearing alloys, both in the form of master alloys for subsequent adding to a ferrous melt and in the form of beryllium and lithium containing steels and other alloys as ultimate commercial products.

The improved process which comprises the subject matter of the invention involves the reduction of metal compounds in the extreme heat of an electric arc by the utilization of a novel type and arrangement of electrodes.

In order more clearly to explain the invention typical physical embodiments are shown in the accompanying drawings in which:

Figure 1 is a diagrammatic illustration of a furnace utilizing the principles of the invention.

Figure 2 is a similar illustration of a modified form of furnace.

Figures 3, 4 and 5 are enlarged details of different types of electrodes employed.

Considered in its essential features the present improved method of producing metals and alloys involves the reduction of metals and metal compounds in the intense heat of an electric arc which is formed between two or more special electrodes. Certain of the electrodes are hollow, that is to say are formed with a central channel permitting the passage of reducing gases or solid particles. In the preferred operation, as will be described, hydrocarbon gases, particularly natural gas, as well as hydrogen may be utilized to establish and maintain the desired reducing conditions in the furnace. In the improved process the electrodes are further utilized as a means of supplying the desired metallic components to the melt and are incorporated in the electrode in such a manner and in such quantities as to insure an accurate controlled analysis of any particular heat.

The operation and advantages of the process utilizing the multiple function electrodes will be more evident from a consideration of the illustrative apparatus shown in the accompanying drawings. The structure shown in Figure 1 comprises essentially a direct arc furnace having a suitable shell 1 lined internally with the desired refractory 2. As will be understood the furnace lining is chosen which is best suited for the particular heat which is to be prepared; for acid practice silica refractories may be used, while for basic practice calcined dolomite or magnesite may be employed. The roof or cover section 3 is provided within the extension 4 which carries a cap 5 serving to mount the top electrode holder 6 through the packing gland 7. The roof section is provided with the outlet line 8 which serves as a vent or if desired as a conduit to a source of vacuum.

The top electrode holder 6, as shown, is of hollow or tubular construction and is provided with means such as the inlet tube 9 to admit a fluid or finely divided solid. The holder is provided in the usual manner with means to connect it to the electrical circuit through the conductor 10.

In accordance with the invention, means are provided for raising and lowering the electrode holder. Illustratively such means may include a standard 11 suitably mounted on the top of the furnace or on some fixed support adjacent the furnace. Slidably mounted on the standard is a bar 12 which is adapted to detachably engage the holder 6. Associated with the bar are means which operate to raise and lower it and the connected holder 6. Such means may be of any suitable type such as the attached rack 13 and meshing pinion 14.

At its lower end the electrode holder is formed with an enlarged cylindrical section 15 which is adapted to hold the electrode 16 in good electrical contact. Preferably the end of the holder is so designed as to provide a cooling space 17. As has been indicated previously, the electrode 16 is of tubular or hollow construction being formed with a central channel 18. With such a construction gases or finely divided solids forced in through the inlet line 9 pass down through the holder 6 and electrode 16 into the zone of the arc.

The lower section of the furnace is formed with a hole or aperture for mounting the bottom electrode 20. As shown, such electrode is held in position by means of a suitable packing gland 21 and the nut 22. The insulation material 24 respectively insulates the bottom and top electrodes and the several sections of the furnace.

The lower section of the furnace is formed with the tap 30 fitted with a plug 31 in the usual manner through which the molten charge is withdrawn. The lower section of the furnace may also be provided with the aperture 32 through which an additional electrode 33 may be inserted to function as a buried hearth electrode. Means may be connected with electrode 33 to progressively move it into the furnace as the section adjacent electrode 20 melts down.

The multiple-functioning electrode 16 may be of different types. In one modification of the invention, as shown for example in Figure 3, this electrode may be made up of a mixture of desired metallic components which are thoroughly compacted and held by a suitable binder. As a typical example such top electrode may be comprised of nickel powder and lithium carbide, with or without other metals or metal compounds and with or without predetermined percentages of slagging material such as calcium boride. The electrode, for example, may be compounded of 50% of the nickel and all of the lithium which is incorporated into the melt. When, for example, a heat containing nickel, beryllium and lithium is to be produced the bottom electrode 20 may be compounded of the remaining 50% of nickel and all of the beryllium which is to be incorporated in the melt and utilized in the electrode in the form of a suitable compound such as beryllium carbide. For the production of a Ni-Li-Be master alloy for subsequent use as an addition agent to an iron or alloy steel heat the electrodes may be so compounded that the product tapped from the furnace contains about 90% nickel, 9% beryllium and 1% or less of lithium.

In operation the electrodes of the type described are mounted in position, the furnace is closed and reduction started by causing an arcing contact between electrodes 16 and 20. The lower electrodes soon begin to reduce and to form a pool of molten metal alloy. During this operation a hydrocarbon gas such as natural gas is fed in under any desired pressure through the upper hollow electrode. The top electrode, which carries the lithium is immersed in the pool of molten metal and combined reduction of all of the compounds of the two electrodes takes place. During this action a considerable increment of heat is added to the melt by reason of the exothermic action of the nickel, lithium and beryllium and a fluid alloy is thus produced.

It is particularly to be observed that by utilizing this concept of the multiple-functioning electrode, control of the analysis of the bath can accurately be maintained.

It is especially to be observed that the concept of feeding in hydrocarbon gases through the hollow electrode is productive of improved results. As these gases pass through the hollow electrode and into the zone of the arc they are rapidly decomposed into substantially atomic condition with a greatly increased activity in reduction due to the presence of carbon and hydrogen in the nascent state. When thus introduced, under the high heat of the arc they appear to be in atomic form and hence have an optimum effect. Also when carbides, like lithium carbide are compounded in the electrode, accelerated reduction is insured due to the relatively high carbon content. In the case of lithium carbide over 58% of the total is carbon.

As will be appreciated, operating under the concept of the present invention a wide range of master alloys, including the ferro alloys, may be produced. For example, utilizing the construction shown, copper-beryllium master alloys may be produced in the approximate proportions of about 94% copper and 6% beryllium. In such production the upper alloy may be compounded from copper powder and beryllium oxide and calcium carbide mixture. The lower or bottom electrode may be compounded of these same materials and in each case the components entering into the formation of the electrode may be suitably bonded by means of asphalt or other suitable binding agent and then suitably compacted or compressed.

The structure of the electrodes themselves are susceptible of wide modification. As shown in Figure 3, and as described above, the electrode may be a compacted mass 40 made up of the desired metal or metallic constituents homogeneously mixed with the binding agent and then suitably compacted or compressed so as to produce a rigid, hollow electrode of the type shown. In lieu of this type of construction an electrode may be produced and used in the invention of the type shown in Figure 4. In this structure a metal shell or die 50 of iron, nickel or any other desired metal may first be made up and the die then filled with the desired mixture such has nickel powder, beryllium oxide and a carbide. After filling the powder may be compacted to any desired degree under pressure.

Similarly as shown in Figure 5, the bottom electrode may be made up of an exterior metal shell 60 into which is filled a predetermined mixture of the desired constituents. These constituents may be compacted under any desired pressure.

Side electrode 33 may be made up of suitably bonded and compacted metallic constituents or may be made up in the form shown in Figure 5.

It will be understood that in the structure shown in Figures 4 and 5 the metal which is utilized for the shell of the electrode may be one of those entering into the composition of the ultimate master alloy. For example, in producing a master alloy of iron-nickel and beryllium the shell 50 may be composed of iron which is filled with the desired mixture of nickel, beryllium oxide and a carbide. Under the reducing arc the electrode is consumed to produce a ferro-nickel beryllium master alloy of an analysis predetermined by the composition of the electrode itself. Where a ferro-nickel-beryllium-lithium master alloy is to be produced an electrode of the type shown in Figure 4 may be used in which lithium carbide is homogeneously incorporated with nickel powder and beryllium oxide in proportions predetermined by the desired ultimate analysis of the master alloy. In the production of these ferro alloys it is advisable to construct the shell 50 of carbon-free iron and where iron in the form of powder is used in the composition of the electrode it is, similarly, substantially carbon free.

It is particularly to be observed that when lithium is to be incorporated in the ultimate master alloy it is preferable to immerse the top electrode, if it carries lithium, in the molten bath. Where the top electrode is maintained above the bath and a lithium alloy is to be produced it is then advisable to incorporate the lithium component in the bottom electrode. These expedients tend to minimize loss of lithium by volatilization. Such loss can further be minimized in the case of lithium bearing alloys by operating the furnace under pressure.

The master alloys of nickel-lithium-beryllium are of peculiar utility in the alloy steel art. Both lithium and beryllium additions markedly improve the physical and chemical characteristics of alloy steels such as the austenitic stainless steels of the 18-chromium 8-nickel type. Lithium added to stainless steel, in relatively small amounts appears to improve the fluidity of the alloy, to improve the grain structure and to minimize the tendency toward intercrystalline corrosion. Lithium is characterized by a marked ability to take up carbon to form lithium carbide which is quite uniformly disseminated through the alloy and does not concentrate at the grain boundaries. The amounts of lithium that are utilized in the electrodes will, of course, be predetermined by the analysis of the ultimate steel.

For example, where the master alloy is to be used as an addition agent to stainless steel it may be alloyed with nickel and/or beryllium in the master alloy so as to be present in the ultimate stainless steel in amounts of from 0.01 up to 0.04 or more. In the case of stainless steels, the beryllium content need not be much in excess of 1% of the ultimate steel. In the production of ultimate alloys made up largely of copper and nickel, the amounts of beryllium and lithium in the master alloy may range from 0.5% or less to 3.0% or more for beryllium and from approximately 0.01% to 0.02% of lithium. For the production of straight nickel steels substantially optimum results in the final steel are secured with approximately 5% nickel, 1% beryllium, 0.01% lithium and the remainder substantially carbon-free iron.

Lithium and beryllium combination, imparts increased toughness to steels, hence master alloys produced under the present invention may be added to nickel chromium steels of the armor plate type containing about 1% chromium and about 3% nickel to produce improved armor plate.

It is clearly to be understood that when the master alloys are to be utilized in the production of other products such as alloy steels the master alloy may, in addition to the metals mentioned, carry any other of the metals entered into the composition of such steel. For example, the master alloy may include any predetermined percentage of the basic metal of the ultimate alloy (such as iron) or any other of the alloy constituents of the ultimate alloy as for example, titanium, vanadium, molybdenum and the like. These may be produced in the master alloy by reduction from the compounds incorporated directly in the electrodes. For example, in the production of billets of a master alloy for incorporation in alloy steels, electrodes may be made up of an aluminum shell filled with a beryllium-lithium core so that aluminum is carried into the ultimate alloy in the desired percentages.

It is also to be observed that the utilization of the hollow electrode permits a further control of the composition of the heat by permitting the addition of powdered metallic components introduced along with the gas in through the hollow electrode. Such addition agents may be powdered metals, as such or metal compounds such as metal carbides and oxides in the powdered form.

It will be seen that the present method insures a very rapid reduction of metallic components to a metal. For example, when lithium carbonate and carbon are incorporated in the structure of the electrode the high temperature of the arc tends first to form the carbide which tends immediately to break down to lithium and carbon. Under these conditions of extreme activity beryllium oxide, or other metal oxides, are rapidly reduced by the extenuated and active carbon and a homogeneous molten alloy is formed.

When the process has been run for the desired period of time the heat may be drawn off in the usual manner by removing the plug 31. When the heat is tapped it is run into any desired form of mold and preferably it is protected from oxidation by cooling in an atmosphere of an inert or reducing gas.

It will be appreciated that within the broad concepts of the invention a number of different specific apparatus may be employed which involves the idea of utilizing multiple-functioning electrode. An example of such modification will be shown diagrammatically in Figure 2. In this type of structure the furnace 60 which comprises a suitable shell and suitable refractory lining is adapted to receive the novel hollow electrode 61 through the roof thereof. This electrode is in communication with the gas inlet 62 and is suitably connected in the electrical circuit through the connector 63. As in the structure shown in Figure 1, the electrode is adapted to be elevated and lowered by means of the rack 64 and pinion 65, the latter being connected by a bar or other suitable means 66 through the upper part of the electrode.

Adjacent the hearth section, the furnace may be provided with separate electrodes 70 and 71 which are suitably connected in circuit through the conductors 72 and 73 respectively. These electrodes are movable inwardly and outwardly of the furnace by any suitable mechanism, shown diagrammatically at 74. Such electrodes may be provided with any suitable cooling means. At one side the furnace may be provided with a slag aperture 75 which may be provided with a removable plug for the purpose of withdrawing slag. At the lower portion of the furnace is formed a duct 76 which may be sealed off by the gate 77. This duct preferably connects with a secondary furnace 79 into which the molten metal is admitted. Such secondary furnace may be utilized to produce a desired ultimate alloy by alloying with iron or combinations of iron and other metals. Such secondary furnace may be of any desired type and is shown diagrammatically as of the direct series arc type including electrodes 80.

The operation of this type of furnace is essentially the same as that previously described. The improved hollow electrode 61 may be compounded in any one of the several manners described and made up of the desired constituents. In starting up, a charge of iron or other base metal may be admitted to the furnace section and this may be reduced to the molten condition by operating the carbon arcs 70 and 71. Thereafter the electrode 61 may be connected in circuit and the reducing gas introduced through the inlet 62. In these circumstances the electrode 61 progressively melts under the heat of the arc and right in the melting zone the introduced gas reduced to a highly active atomic state, aids in the reduction of the compounds incorporated in the electrode to the molten metallic form. The molten alloy may then be discharged intermittently or continuously through the gate 77 into the second furnace 79 wherein it may be refined or alloyed with additional metals such as iron, iron-chromium, iron-nickel and the like.

It will thus be seen that the present invention provides a highly effective method of producing master alloys of predetermined analysis. Due to the utilization of the multiple-functioning electrode in conjunction with a highly active reduction zone numerous advantages are secured, such as quick and optimum availability of heat, the maintenance of any desired temperature and pressure, the optimum reduction due to the utilization of the reducing fluid in the highly active atomic state and the like. While particular furnace structures have been shown it is to be understood that these are merely illustrative, for the invention is considered to reside broadly in the concept of utilizing multiple-functioning electrodes of the class described for the purpose of producing improved types of metallurgical products.

I claim:

1. In the production of ferro alloys that method of incorporating beryllium and lithium in a ferro master alloy which comprises incorporating compounds of beryllium and lithium in an electrode at least one of which compounds is a carbide connecting such electrode in an electric furnace and reducing such compounds to the molten metallic state.

2. An electrode for use in electric furnaces for the production of ferrous alloys which comprises a compacted mass including iron and a carbon compound of lithium.

3. An electrode for use in electric furnaces for the production of alloys which comprises a conductive, self-sustaining mass of compacted discrete particles including a carbon compound of beryllium.

4. An electrode for use in electric furnaces for the production of alloys which comprises a hollow tubular unit containing a reducible carbide of lithium.

5. An electrode for use in electric furnaces for the production of alloys which comprises a hollow tubular unit containing a reducible carbide of beryllium.

6. A method of producing alloys in an electric furnace which comprises forming a hollow tubular electrode containing a reducible carbide of beryllium, connecting such hollow electrode in the circuit of an electric furnace; and arcing such electrode while introducing through the central channel thereof a quantity of natural gas.

7. A method of producing alloys in an electric furnace which comprises forming a hollow tubular electrode containing a reducible carbide of beryllium, connecting such hollow electrode in the circuit of an electric furnace; and arcing such electrode while introducing through the central channel thereof a quantity of hydrogen.

8. A method of producing alloys in an electric furnace which comprises forming a hollow tubular electrode containing a reducible carbide of lithium, connecting such hollow electrode in the circuit of an electric furnace; and arcing such electrode while introducing through the central channel thereof a quantity of natural gas.

9. A method of producing alloys in an electric furnace which comprises forming a hollow tubular electrode containing a reducible carbide of lithium, connecting such hollow electrode in the circuit of an electric furnace; and arcing such electrode while introducing through the central channel thereof a quantity of hydrogen.

10. A method of producing lithium-beryllium alloys in an electric furnace which comprises forming hollow tubular electrodes severally containing reducible carbide of lithium and reducible carbide of beryllium, connecting such electrodes in the circuit of an electric arc furnace, and striking an arc between said electrodes while introducing through the central channels thereof a quantity of natural gas.

HARRY HOWARD ARMSTRONG.